Jan. 11, 1949.                E. A. ROCKWELL                 2,458,736
                    SELF-CONTAINED HYDRAULIC SERVO MECHANISM
Filed June 29, 1943                                    9 Sheets-Sheet 1
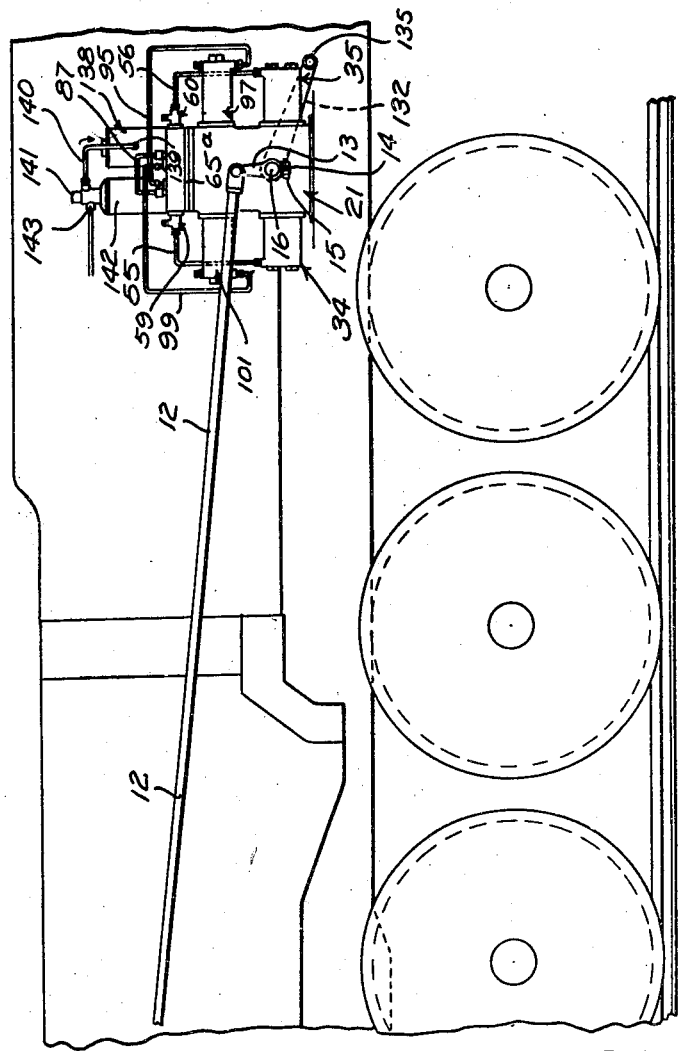
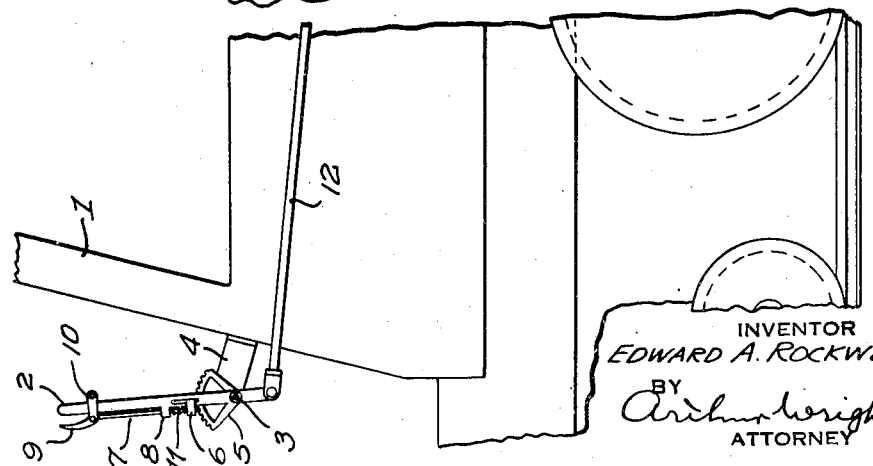
INVENTOR
EDWARD A. ROCKWELL
BY
ATTORNEY

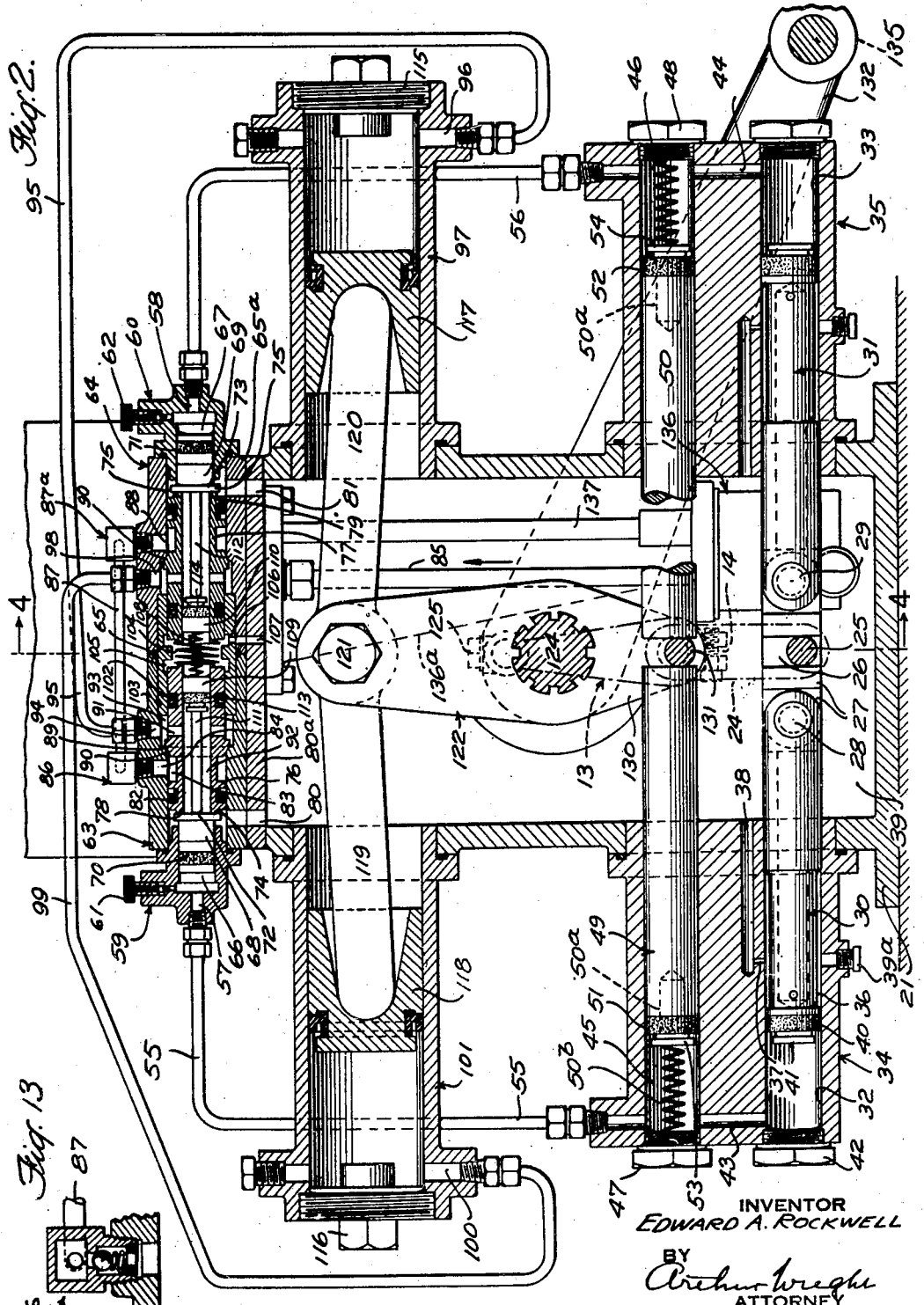

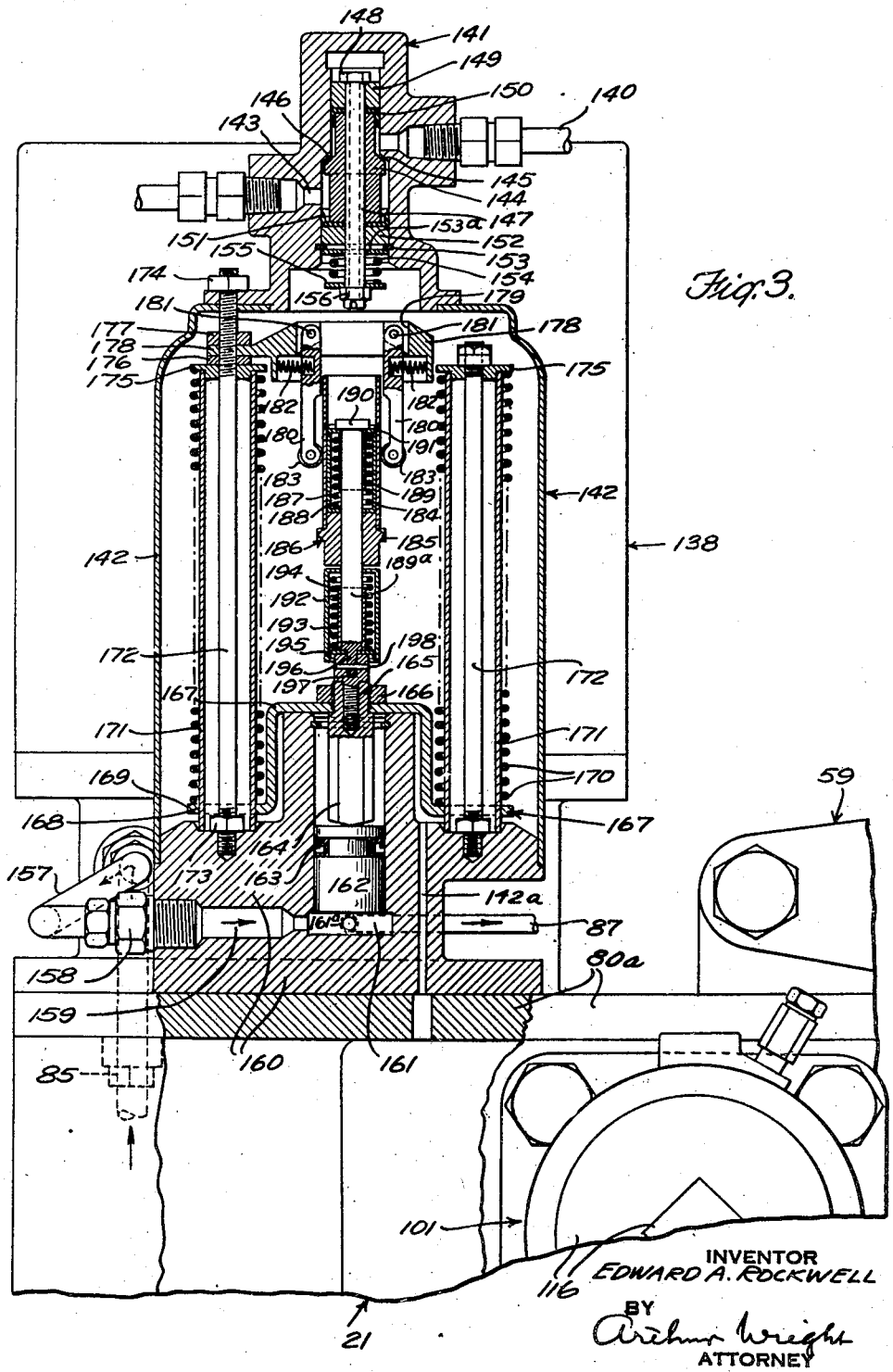

Jan. 11, 1949.   E. A. ROCKWELL   2,458,736
SELF-CONTAINED HYDRAULIC SERVO MECHANISM
Filed June 29, 1943   9 Sheets-Sheet 4

INVENTOR
EDWARD A. ROCKWELL
BY
Arthur Wright
ATTORNEY

Jan. 11, 1949.  E. A. ROCKWELL  2,458,736
SELF-CONTAINED HYDRAULIC SERVO MECHANISM
Filed June 29, 1943  9 Sheets-Sheet 5

INVENTOR
EDWARD A. ROCKWELL
BY
Arthur Wright
ATTORNEY

Jan. 11, 1949.  E. A. ROCKWELL  2,458,736
SELF-CONTAINED HYDRAULIC SERVO MECHANISM
Filed June 29, 1943  9 Sheets-Sheet 6
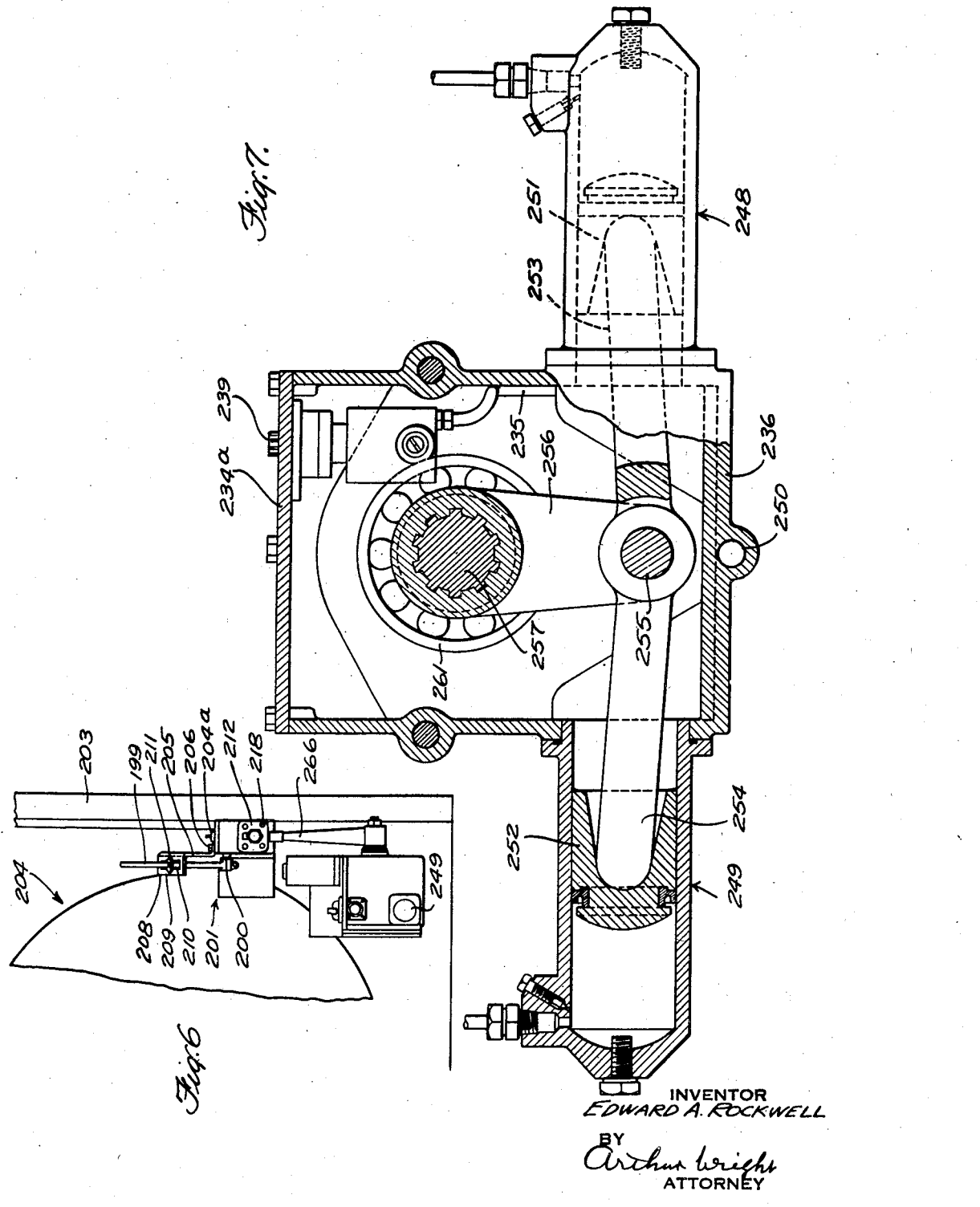
INVENTOR
EDWARD A. ROCKWELL
BY
Arthur Wright
ATTORNEY Jan. 11, 1949.  E. A. ROCKWELL  2,458,736
SELF-CONTAINED HYDRAULIC SERVO MECHANISM Filed June 29, 1943  9 Sheets-Sheet 8

INVENTOR
EDWARD A. ROCKWELL
BY
ATTORNEY

Jan. 11, 1949.  E. A. ROCKWELL  2,458,736
SELF-CONTAINED HYDRAULIC SERVO MECHANISM
Filed June 29, 1943  9 Sheets—Sheet 9
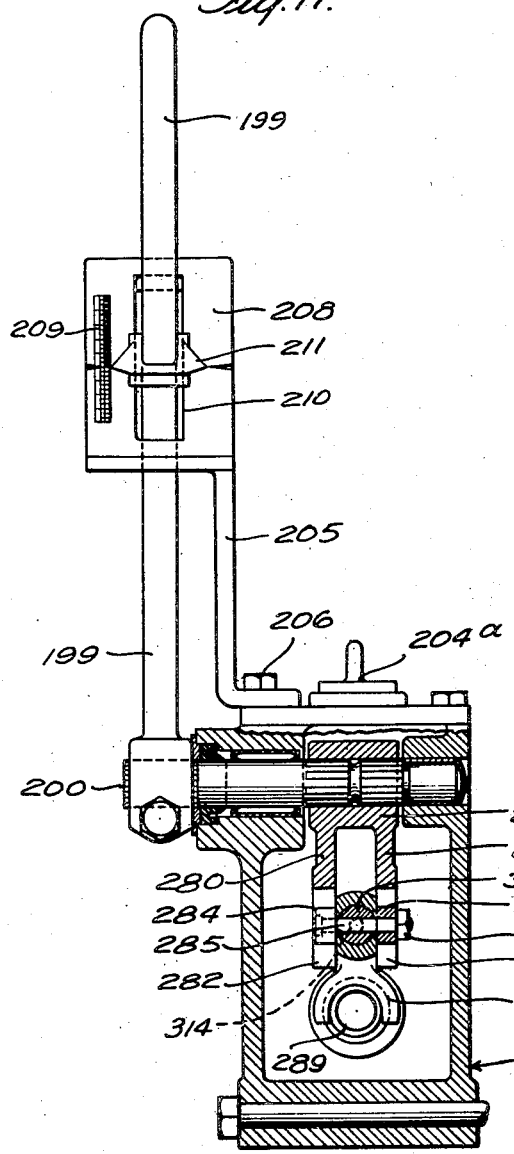
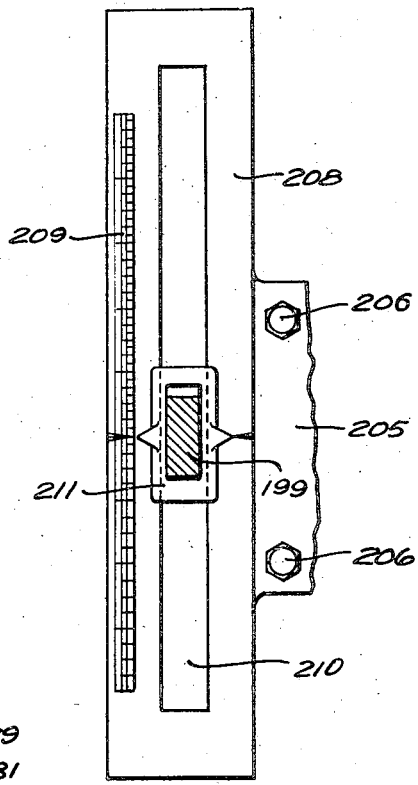
INVENTOR
EDWARD A. ROCKWELL
BY
Arthur Wright
ATTORNEY Patented Jan. 11, 1949

2,458,736

UNITED STATES PATENT OFFICE 2,458,736

SELF-CONTAINED HYDRAULIC SERVO MECHANISM

Edward A. Rockwell, Cleveland, Ohio

Application June 29, 1943, Serial No. 492,745

16 Claims. (Cl. 60—52)

My invention relates particularly to a self-contained power operated servo mechanism for controlling any device requiring a relatively large amount of work to move the same. Also, it is especially adapted for use where small follow-through manual operating input forces are required either by mechanical connections to the input or by other connections thereto, such for example as in the control of automotive vehicles, airplanes, steam engines, steering gears or locomotive reverse gears.

The object of my invention is particularly to provide a power-driven apparatus of the above character, for controlling any desired device. One of the objects is to provide a hydraulic power operated mechanism which is positive, certain and accurate in operation and which eliminates the disadvantages in previous valve-operating devices. A further object is to provide a power-driven valve-operating mechanism which operates effectively upon the principle of hydraulic pressure and volume displacement between the control mechanism and the output power members. For this purpose, furthermore, I may utilize, also, a self-latching construction which has fast and accurate metering characteristics. Also, one-way check valves may be used in the high pressure lines leading to the valves to prevent reversibility in the output members. Furthermore, I have found it advantageous to utilize hydraulic pressures obtained from a manually operated master cylinder to maintain the coordination of travel between the input means and the output means. The results obtained are facilitated by the very slight travel of the valves, which assists in providing accurate increments of fluid for the control of the output means. This arrangement makes it feasible to provide an efficient hydraulic remote control whereby an accurate control may be readily obtained. Also, the master cylinders used are provided with suitable liquid compensation in order to maintain the phase relation between the control means and the output means. Still another object is to provide a remotely controlled power unit for controlling or operating mechanisms in which the power unit is a compact self-contained power unit.

In accordance with my invention, with the high hydraulic pressures available, cylinders of relatively small displacement can be used for controlling the output. These can be most conveniently mounted upon a box section housing and opposed to each other. Pistons are connected by push rods to an output shaft trunnioned in the housing. The pivot of the crank shaft and output lever can be located at the same point that the lifting or tumbling shaft is located, and the whole unit mounted together. Monitor or travel control cylinders and pistons are mounted on either side below the output shaft, and adapted to rest removably against a pin fixed on an extension of the crank attached to said shaft. Control master cylinders, in one form, are located below the monitor and are preferably bored in the same casting. The pistons are positively connected by links to an independent crank journaled in the housing and having a control lever positioned on the outside of the box for convenient attachment to the reach rod or other control. The interior of the box acts as a supply reservoir for the oil in which the gear pump and cylinder openings are submerged, so as to receive the return flow from the valves. The pump is mounted on a bracket extending down from the cover plate to which the air motor is also secured. The valves and pressure controller are also mounted on the cover plate together with a tube connection from the pump outlet, making a complete sub-assembly, so that these parts can be conveniently removed from the box. External pipe connections are made from each master-monitor outlet to the respective valve cylinder outlet. Air bleeders are provided at the high point of these connections. Preferably check valves are placed in the lines leading from the pump and the controller to each of the valves to make the action irreversible. Lines also connect with outlets from these valves to the respective power cylinders. Air bleeders are provided at the top of these cylinders to initially exclude all air and to allow for the initial cycling of the unit.

Further objects of my invention will appear from the detailed description of the same hereinafter.

While my invention is capable of being carried out in many different ways for the purpose of illustration I have shown only certain embodiments of my invention in the accompanying drawings, in which Fig. 1 is a diagrammatic side elevation of a locomotive reverse gear controlling mechanism operated in accordance with my invention;

Fig. 2 is a longitudinal vertical section of the valves and operating cylinders used therein;

Fig. 3 is an end elevation, partly in section, of the same;

Fig. 6 is a diagrammatic rear elevation of the same;

Fig. 7 is a longitudinal section of a power cylinder and attached parts in the form of my invention shown in Fig. 5;

Fig. 11 is a transverse section of the modification shown in Fig. 7;

Fig. 12 is a plan view of the scale indicator shown in Fig. 5; and

Fig. 13 is a vertical section of a check valve on the high pressure inlet to one of the modulator valves.

Figure 4:
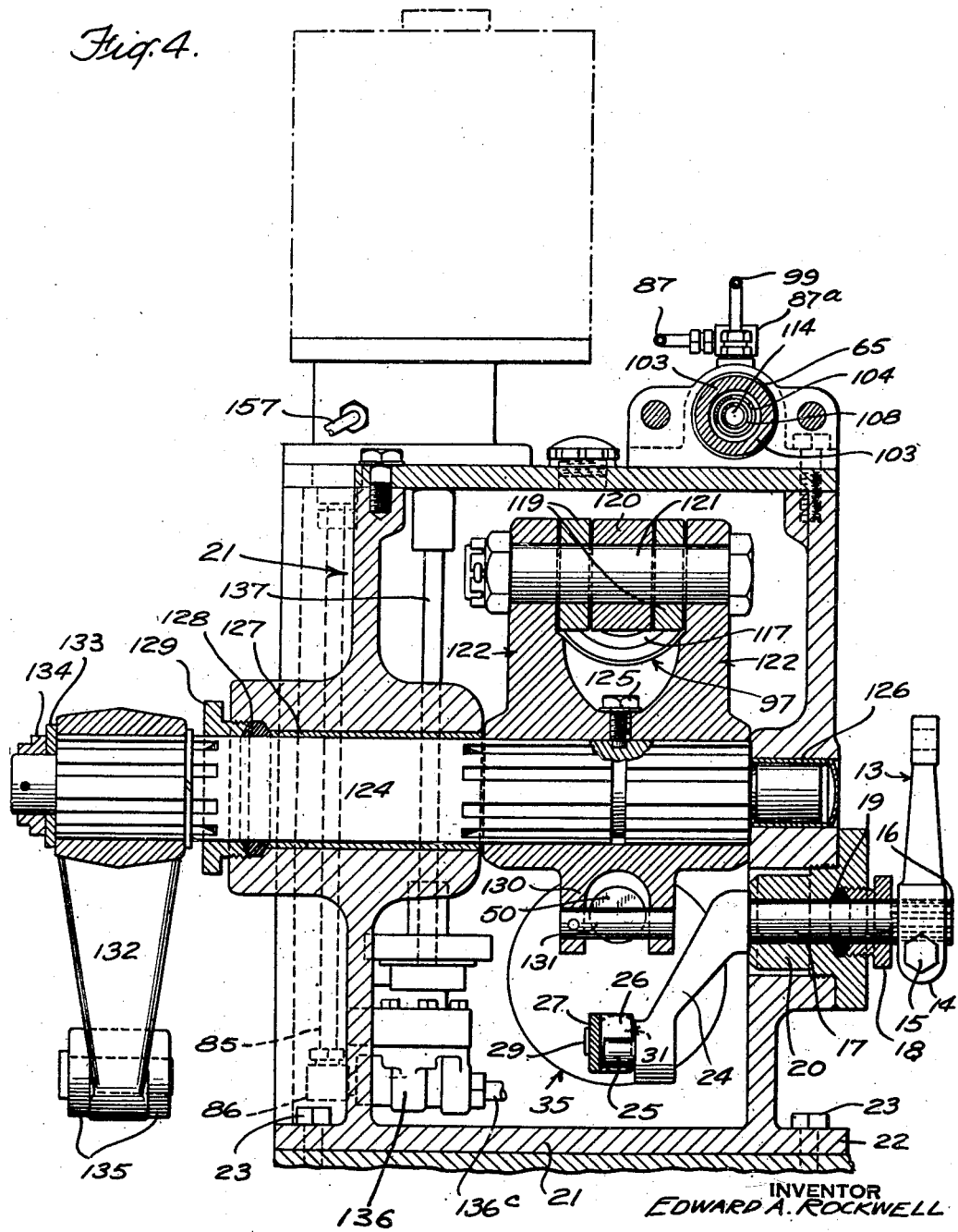
Fig. 4 is a transverse section of the same taken on line 4—4 of Fig. 2.

Referring first to the form of my invention shown in Figs. 1 to 4, I have shown in a steam locomotive cab 1 a hand operated lever 2 carried by a pivot 3 on a bracket 4 attached to said cab. Said bracket 4, furthermore, has attached thereto a segmental rack 5 to cooperate with a sliding catch 6 mounted on the lever 2, to which there is attached a rod 7 passing through a projection 8 on a lever 2 and connected to a bifurcated hand operating lever 9 having a pivot 10 on said hand lever 2. A spring 11 around the rod 7 and located beneath the projection 8 normally keeps the catch 6 in engagement with any one of the notches of the rack 5. Attached to the lower end of the hand lever 2 there is a link or reach rod 12 which is pivoted to the upper end of a manually operated lever 13 having a split end 14 adapted to be tightened in place by a screw 15 on a splined end 16 of a master cylinder operating shaft 17 which passes through a gland nut 18 having a packing 19 carried by a large assembly bushing 20 screw-threaded into a cylinder housing 21 having a supporting flange 22 for attaching the same by screws 23 to any desired part of the locomotive. The inner end of the master cylinder shaft 17 has thereon a crank 24 provided with a lateral crank pin 25 so as to be received in a recess 26 in a link 27 having pivots 28 and 29 connected to master cylinder pistons 30 and 31, respectively, carried in master cylinders 32 and 33 in master cylinder blocks 34 and 35, respectively. The cylinder blocks 34 and 35 are attached to the side of the cylinder casing 21 in any desired manner. As the two master cylinders are constructed in the same way only one thereof will be described. The master cylinder plunger 30 has around its periphery an annular chamber 36 which communicates by a port 37 with a passageway 38 in the cylinder block 34 and which leads to a central chamber 39 in the cylinder casing 21 for liquid compensation of the cylinder 32, the port 37 being uncovered at the end of the path of the piston in the cylinder 32. The annular chamber 36 has a hole closed by a plug 39a to enable the port 37 to be drilled. A rubber U-shaped seal 40 is provided on the piston 30 to the right of a flange 41 on the end of said piston. Also, the cylinder 32 has a screw cap 42.

The cylinders 32 and 33 have discharge ports 43 and 44 which lead, respectively, to travel control cylinders 45 and 46, closed by screw caps 47 and 48, and which have therein travel control plungers 49 and 50, referred to again hereinafter, each of the plungers 49 and 50 having a recess 50a for a plunger return spring 50b. These two travel control plungers have U-shaped rubber seals 51 and 52 adjacent to flange heads 53 and 54 thereon. The hydraulic liquid discharged under manual pressure from the chamber 32 and 33, respectively, after reaching the cylinders 45 and 46, is delivered by pipes 55 and 56 to inlet ports 57 and 58 in valve cylinder heads 59 and 60, respectively, having air bleeder screws 61 and 62. The cylinder heads 59 and 60 are located, respectively, on valve cylinders 63 and 64 joined together with a packing 65 and fastened in any desired way on the top of a pair of plates 65a on top of the cylinder housing 21. The cylinder heads 59 and 60, furthermore, have within the same, respectively, chambers 66 and 67 having therein plungers 68 and 69 provided with U-shaped seals 70 and 71. The said plungers 68 and 69, also, have thereon heads 72 and 73 which provide valve seats 74 and 75 for cooperating with tubular valves 76 and 77 provided with annular valve elements 78 and 79 cooperating with the valve seats 74 and 75. The valve 74, 78 acts as a discharge valve communicating with a discharge port 80 in the valve cylinder 63 communicating with corresponding ports in the plates 65a and cover plate 80a and which in turn communicates with the chamber 39 in the cylinder housing 21 through the cover plate 65a on the housing 21. Similarly the valve 75, 79 communicates with a similar port 81 communicating with said chamber 39. The tubular valve members 76 and 77 are constructed just alike and only one thereof will be described in detail accordingly. The tubular valve 76 has an annular seal 82 and a peripheral valve-balancing chamber 83 communicating with an inlet port 84 connected to a high pressure hydraulic liquid inlet pipe 85 provided with a check valve 86. A branch high pressure hydraulic liquid inlet pipe 87, having a check valve 87a, leads to a similar inlet 88 on the valve cylinder 64. The said tubular valve 76, furthermore, has a conical inlet valve 89 cooperating with a valve seat 90 on the inside of the valve cylinder 63. Also, said tubular valve 76 has a plurality of radial apertures 91 connecting with a cylindrical chamber 92 in the tubular valve 76 and with a chamber 93 on the outside of the tubular valve 76 which leads to a port 94 for supplying the modulated high pressure liquid which passes through the valve 90, 89 to a pipe 95 and thence to an inlet port 96 on a power cylinder 97. Similarly, the valve cylinder 64 has a delivery outlet aperture 98 for the liquid delivered by the valve 77 which is thence conveyed by a pipe 99 to an inlet opening 100 on a power cylinder 101. The tubular valve 78, furthermore, has an annular seal 102 within a sleeve 103. Also, between the inner ends of the tubular valves 76 and 77, which are individually self-lapping, there is a coil spring 104 for pressing the conical valves 89 against their seats 90. The spring 104 is located in a chamber 105 which communicates by a port 106 in the sleeve 103 and a passageway 107 with the chamber 39. The passageway 107 serves as a breather opening. An internal spring 108 between pistons 109 and 110, located within the tubular valves 76 and 77, serves, by means of piston rods 111 and 112 on said pistons 109 and 110 and attached to the heads 72 and 73 respectively, to unseat the valves 74 and 75 normally. Also, it will be noted that the pistons 109 and 110 and the attached plunger heads 72 and 73 serve to balance the release valves 74, 78 and 75, 79. Rubber seals 113 and 114 are located on the piston rods 111 and 112.

The power cylinders 97 and 101 are provided with screw caps 115 and 116. Pistons 117 and 118 and piston rods 119 and 120 are connected to a pivot 121 on a lever arm 122, which is in the form of a yoke carrying said pivot 121. The lever arm 122, furthermore, is carried upon a splined shaft 124 having a locking screw 125. The shaft 124 is carried within bushings 126 and 127 in the cylinder housing 21 and a packing 128 is located adjacent to the bushing 127 and held in place by a gland nut 129. Furthermore, the lever 122 has a downwardly directed bifurcated end 130 provided with a cross pin 131 which is located between the inner ends of the two travel control plungers 49 and 50.

Figure 5:
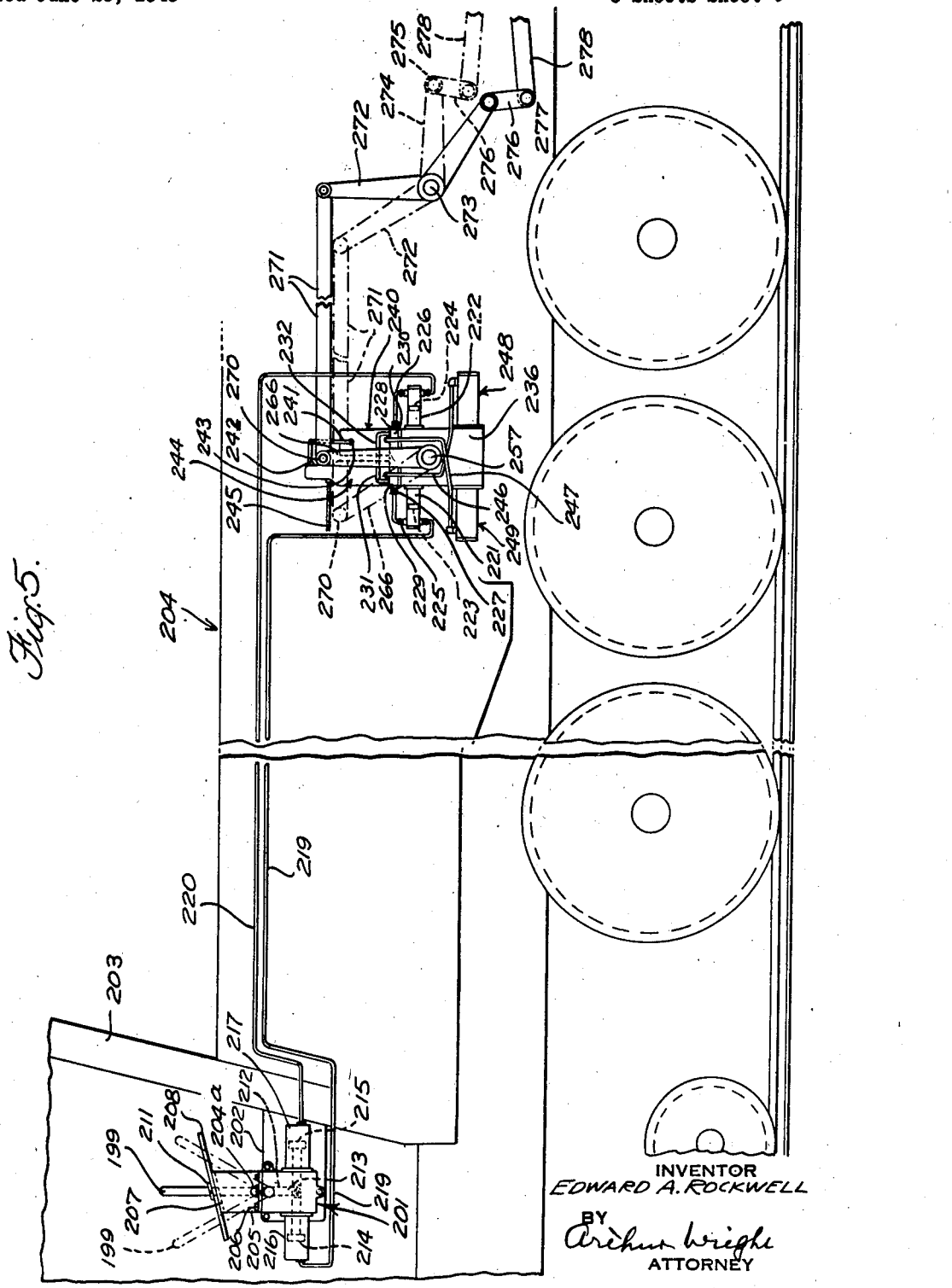
Fig. 5 is a diagrammatic side elevation of a modified form of my invention.
Figure 8:
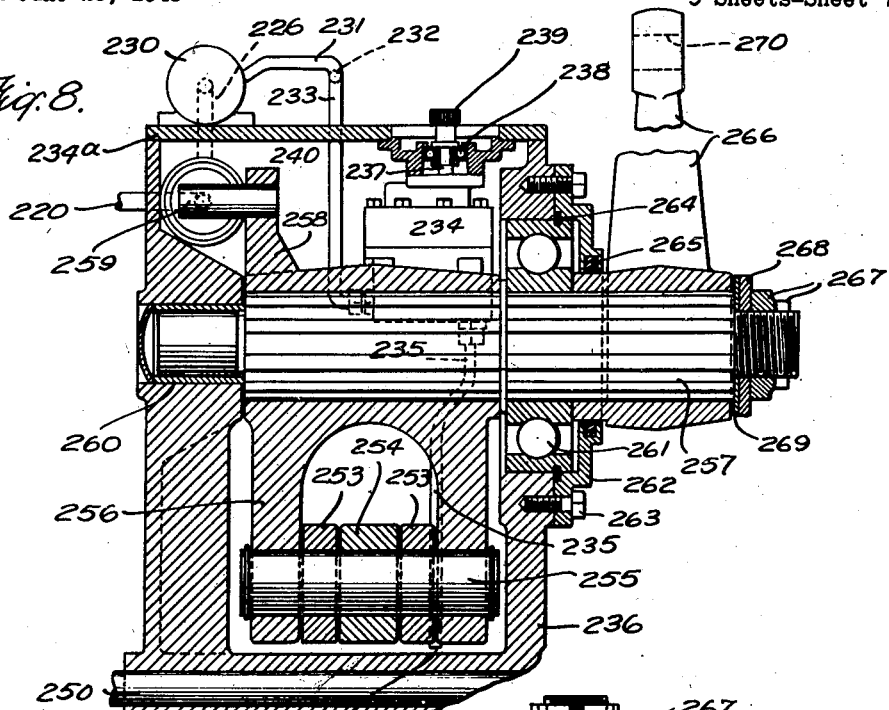
Fig. 8 is a transverse section thereof taken on line 8—8 of Fig. 9.
Figure 9:
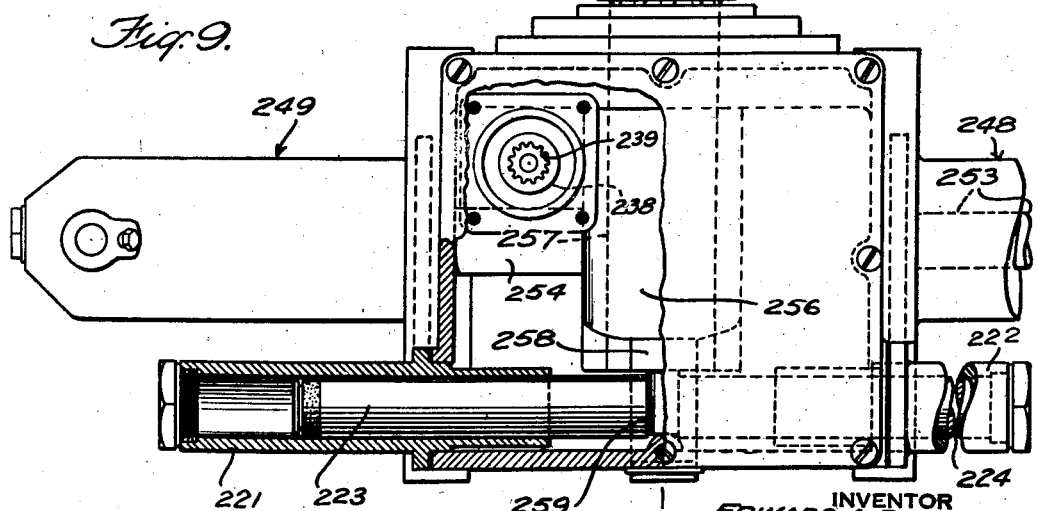
Fig. 9 is a plan view, partly in section, of the same.

On the outer end of the shaft 124 there is a lever arm 132 fastened in place with a washer 133 and a nut 134. The lower end of the lever arm 132 is pivoted to a yoke 135 of a locomotive reverse gear such as is shown, for example, in Fig. 5, and for operating any desired type of locomotive reverse gear, such as is shown in Marks, Mechanical Engineers Handbook, first edition, 1916, pages 975 and 977, published by McGraw-Hill Book Co. Inc., New York.

The high pressure liquid supplied by the pipe 85 to the tubular valve 76, 77 is delivered from a gear pump 136 of any desired type, mounted on a bracket 136a (Fig. 2) on the cover plate 80a so as to receive liquid from the chamber 39 by the usual inlet opening, which is driven by a shaft 137, which shaft in turn is driven by an air vane or other motor 138, as shown in Fig. 1. However, it may be an electric motor, as shown in my Patent No. 2,292,546, upon Snap action apparatus. The motor 138, which is fastened to the cover plate 65a, may be driven by compressed air received through an opening 139 from a pipe 140 which leads to a fitting 141 on the top of a pressure accumulator casing 142, also fastened to the cover plate 65a, having a vent and drain passageway 142a leading to chamber 39 and a compressed air inlet opening 143. The supply of compressed air to the pipe 140 is controlled by a valve plunger 144 having a conical valve member 145 cooperating with a valve seat 146 on the interior of the fitting 141. The valve 145, 146 is normally unseated. For this purpose, the valve plunger 144 has a longitudinal passageway to receive a bolt 147, on one end of which there is a head 148 adjacent to an annular spacing plunger 149 to hold in place a rubber seal 150. The other end of the bolt 147 passes through a seal 151 and a spacing member 152 and thence through a washer 152a and a split retainer ring 153 and a washer 153a in the fitting 141 against the lower face of which there is provided a coil spring 154 held in place by a washer 155 and a nut 156. The supply of compressed air from the inlet 143 to the port 140 is adapted to be cut off automatically when there is a sufficient accumulation of pressure in the hydraulic liquid in the system so as to interrupt the operation of the gear pump 136. For this purpose, the pipe 85 has a branch pipe 157 which leads by a fitting 158 to a passageway 159 in a base block 160 to which the accumulator casing 142 is secured. The passageway 159 leads to a plunger chamber 161, having a port 161a leading to the pipe 87 and having a plunger 162 therein provided with an annular seal 163. The plunger 162 operates against a screw head 164 which is located over a snap action screw 165 where it is held in place by a nut 166 so as to support a dished plate 167 having a series of openings 168 in a flange 169 there-on which supports a plurality of coil springs 170 around tubes 171 within the holes 168. The tubes 171 receive through the same locking bolts 172 which hold the casing 142 against the block 160 by being screw-threaded into said block and having their ends provided with nuts 173 and 174 so as, also, to hold the fitting 141 on the casing 142. At their upper ends the coil springs 170 are retained in place by washers 175 on the rods 172 and adjacent to said washers 175, nuts 176 and 177 hold in place a spider 178. The said spider 178 has a central aperture 179 adjacent to which there are a plurality of pivoted arms 180, carried on pivots 181 and pressed inwardly by springs 182. The lower ends of the arms 180 have pivoted therein rollers 183 to bear on the outside of a tubular member 184 having secured thereto a peripheral flange 185 located on a snap action block 186. Within the tubular member 184 there is a spring retainer sleeve 187 carrying within the same a coil spring 188 located on the outside of a sleeve 189. The sleeve 189 is located on a snap action rod 189a which at this end has a head 190 adjacent to a washer 191. The rod 189a is arranged to slide within the snap action block 186 and beneath said block the rod 189a carries a spring retainer sleeve 192 within which there is a coil spring 193 located over a sleeve 194 on the rod 189a. Adjacent to the sleeve 194, at its lower end, there is provided a washer 195 and the rod 189a is arranged to hold the washer 195 in place by the rod 189a being fastened by a tongue 196 and a groove 197 and a cross pin 198 to the snap action screw 165. This snap action is shown in detail in my U. S. Patent No. 2,292,546, above referred to.

In the modified form of my invention shown in Figs. 5 to 9 and 12, I have provided a hand-operated lever 199 carried on a shaft 200 passing into a casing 201 mounted on a bracket 202 in a cab 203 of a steam locomotive 204. On the top of the casing 201, which has a vented filling cap 204a, there is fastened a bracket 205, by means of screws 206, which carries, on the top of an inclined flange 207 thereon, an inclined indicator plate 208 having calibrations 209 which are substantially equidistant, except that there are more subdivisions in the forward drive than in the rearward drive. The hand lever 199 passes through a slot 210 in the indicator plate 208 and has loosely supported around the hand lever 199 a pointer plate 211 which slides along the indicator plate 208 as the hand lever 199 is shifted. The said shaft 200, furthermore, carries a lever 212 which operates in a slot 213 between two master cylinder pistons 214 and 215 located in master cylinders 216 and 217, respectively, which are attached to the casing 201 by screws 218. These master cylinder pistons 214 and 215 may be constructed the same as the master cylinder piston 30 and 31 previously described. Pipes 219 and 220 lead from the ends of the master cylinders 216 and 217 to the ends of travel control cylinders 221 and 222 having travel control pistons 223 and 224 constructed like the travel control pistons 49 and 50. From the travel control cylinders 221 and 222 pipes 225 and 226 convey the liquid, which is received from the master cylinders 216 and 217, to the outer ends of plunger housings 227 and 228 attached to valve casings 229 and 230 which are constructed the same and with the same parts therein as in the case of the valve casings 63 and 64. The high pressure liquid for the valve casings 229 and 230 is supplied thereto through pipes 231 and 232, which are connected together, having a feed pipe 233 connected to a gear pump 234 constructed the same as the gear pump 136 previously described. The said gear pump 234, however, is mounted on a cover plate 234a and has an inlet pipe 235 leading to the bottom of a cylinder housing 236 to which the travel control cylinders 221 and 222 and the valve casings 229 and 230 are attached and within which the gear pump 234 is located. One of the gears of the gear pump 234 is carried on a shaft 237 having a bearing 238 and the said shaft 237 is driven by a pneumatic vane motor, mounted on the cover plate 234a, by means of a gear 239 of any desired character, said pneumatic motor, like the motor 138, being located in a chamber 240 which has a compressed air pipe 241 for driving said pneumatic motor, leading into the same from a fitting 242, having an inlet 243 to receive the compressed air. The fitting 242 is mounted on an accumulator 244 which is constructed the same as the accumulator 142 previously described, and which is mounted on the cover plate 234a. This accumulator 244 receives compressed air by an opening 245.

Delivery pipes 246 and 247, for delivery of high pressure liquid, are connected to the valve casings 229 and 230 so as to supply the said liquid to power cylinders 248 and 249, respectively, which are constructed the same as the power cylinders 97 and 101 previously described. The said power cylinders are attached to the cylinder housing 236, the same being provided with holes 250 for attachment by screws to any suitable part of a locomotive. The cylinders 248 and 249 carry pistons 251 and 252 connected by piston rods 253 and 254 to a pivot pin 255 of a bifurcated crank arm 256 splined on a shaft 257 carried by the casing 236. Integral with the crank arm 256 there is a subsidiary crank 258 having a laterally directed pin 259 which is located between the inner ends of the two travel control pistons 223 and 224. On the outer end of the shaft 257, which is supported within the cylinder casing 236 by a bushing 260 and a ball-bearing 261 fastened in place by a cap 262 and screws 263 provided with a split locking ring 264 and a packing 265, there is splined a lever arm 266 held in place by a nut 267 and washers 268 and 269. The lever 266 carries on its outer end, by means of a pivot 270, a link or reach rod 271. The link 271 is pivotally connected to a bell crank lever 272 of a locomotive reverse gear carried on a fixed pivot or lifting shaft 273. The bell crank lever 272 has a lower arm 274 having a pivotal connection 275 to a lifting link 276 which has a pivotal connection 277 to a radius rod 278 of said locomotive reverse gear and which may be, for example, any of the locomotive reverse gears referred to in Marks, Mechanical Engineers Handbook, above referred to.

Figure 10:
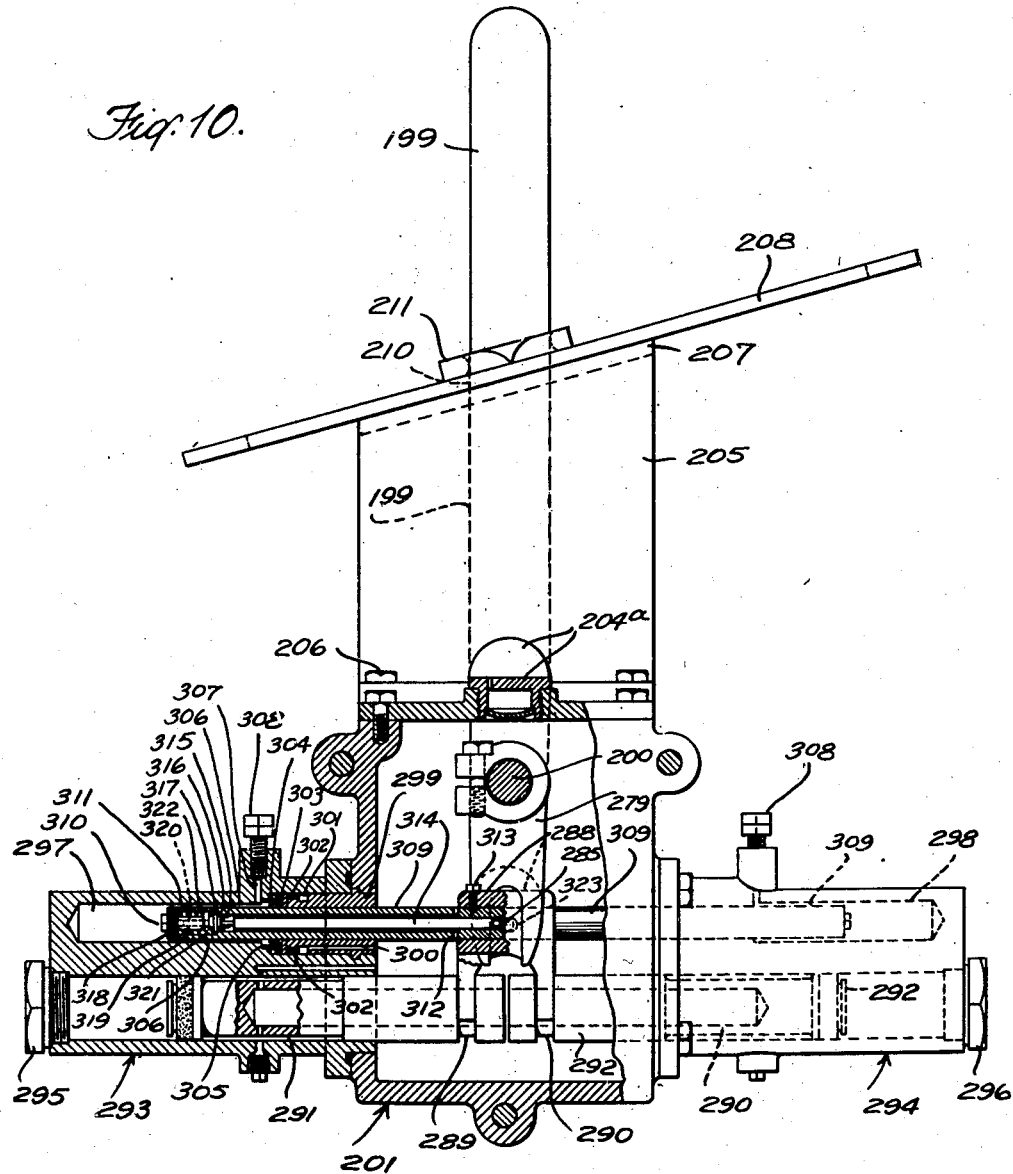
Fig. 10 is a longitudinal section showing the use of a hydraulic latch in a further modified form of my invention.

In the form of my invention shown in Figs. 10 and 11, I have illustrated a modification of the embodiment shown in Figs. 5 to 9. The form of my invention in Figs. 10 and 11 is shown mainly to illustrate a form of hydraulic latch or locking mechanism for maintaining the hand lever 199 and radius rod 278 in any desired adjusted position. In this instance, the shaft 200 is provided within the casing 201 with a bifurcated crank 279, two arms 280 and 281 of which are provided with slots 282 and 283 to receive sliding square blocks 284 and 287 on a bolt 285 having a nut 286 thereon. The blocks 284 and 287 slide in the recesses 282 and 283, respectively, and between the two arms 280 and 281 there is a yoke member 288, through which the bolt or cross pin 285 passes, which extends into slots 289 and 290 on master cylinder pistons 291 and 292 constructed like the master cylinder pistons previously described. In this instance the pistons 291 and 292 are located in cylinder blocks 293 and 294 having screw caps 295 and 296. The cylinder blocks 293 and 294 also contain within the same hydraulic latch cylinders 297 and 298, both of which are constructed alike and only one of which, therefore, will be described in detail. Each of these cylinders contains within the same a bushing 299 provided with an inlet passageway 300 connecting with a chamber 301, adjacent to longitudinal ports 302, communicating with a U-shaped sealing ring 303 held in place by a retaining ring 304 which abuts against a shoulder 305 in the cylinder 297, which in turn leads into an annular chamber 306 forming a part of the hydraulic latch chamber 297, leading to an air bleeder port 307 normally closed by an air bleeder screw 308 of the usual construction. Within the bushing 299 there is a sleeve plunger 309 provided at one end with a screw cap 310. Adjacent to the screw cap 310 there are radial ports 311 in the sleeve plunger 309. Also, said sleeve plunger has radial ports 312 within the cylinder casing 201 and it will be noted that the said sleeve plunger 309 extends, likewise, into the cylinder 298, the portion within the cylinder 298 being constructed the same as the portion thereof within the cylinder 297. A screw 313 passes through the yoke 298 into the sleeve plunger 309 to hold it in fixed relation in regard thereto. Also, within each of the sleeve plungers 309 there is a valve operating rod 314 which contacts with the cross pin 285 and at its other end has flutings 315 adjacent to a conical valve seat 316 on the inside of the sleeve plunger 309. A valve head 317 is adapted to seat on the conical valve seat 316, the valve head being located in a valve chamber 318 adjacent to the screw cap 310, which has a hollow stem 319 to receive a valve stem 320 which is integral with the valve head 317. A shoulder 321 on the valve stem 320 is provided for supporting a coil spring 322 located around the hollow stem 319 so that the left end of said spring 322 seats against the screw cap 310. As shown in Fig. 10, the yoke 288 and the sleeve plunger 309 have a lateral elongated hole 323 through which the bolt 285 passes, so as to provide a slight lost motion between the movement of the yoke 279 and the sleeve plunger 309 so that when the yoke 279 is moved to the left or right, in Fig. 10, it will first move the valve operating rod 314 to unseat the particular valve 317 before the sleeve plunger 309 is moved in the corresponding direction in said figure. Without such previous movement of the valve rod 314 being possible, the movement of the master cylinder plunger 291 towards the left or right in said figure would not unseat the particular valve 317, so that the liquid in the latch chamber 297 would be trapped therein to prevent the movement of the valve plunger 309 as well as the master cylinder piston 291 to which it is attached until the hand lever 199 has been moved previously. In this way, the hydraulic latch cylinders 297 and 298 and their pistons will hold the master cylinder pistons 290 and 291 in any adjusted position, thus maintaining the adjusted position of the hand lever 299 until said hand lever is again moved for the adjustment of the position of the locomotive reverse gear. During any withdrawal movement of the sleeve plunger 309 from its particular cylinder the liquid will enter from the casing 201 through the passageway 300, past the seal 303, through chamber 305 and into the annular chamber 306 to the hydraulic latch cylinder 297.

In the operation of my invention shown in Figs. 1 to 4, when the hand lever 2 is in the middle position, as shown in Fig. 1, the locomotive is at rest. If it is desired to drive the locomotive forwardly it is moved towards the right in said figure and if it is to be driven rearwardly it is moved towards the left. By the movement of said lever 2 to the right the link or reach rod 12 is moved to the left together with the lever 13. This moves the crank 24 to the right, in Fig. 2, thereby moving the master cylinder piston 31 to the right and simultaneously delivering the liquid under manual pressure by the pipe 56 to the interior of the plunger cylinder 67 while at the same time withdrawing the liquid from the plunger cylinder 66 to the pipe 55. Accordingly, the valve 75, 79 will become seated, thereby unseating the pressure liquid inlet on the tubular valve member 77 and admitting the pressure liquid past this inlet, whence it is delivered by the pipe 99 to the interior of the power cylinder 101 so as to move the piston 118 therein to the right, in Fig. 2, while simultaneously moving the piston 117 in the other power cylinder 97 to the right in said figure. The discharge from the power cylinder 101 is accomplished by the unseating of the valve 75, 79 and the discharge of the liquid by the port 81 to the interior of the casing 21. This movement of the power pistons 117 and 118 results in moving the crank 122 to the right, in Fig. 2, and thereby the shaft 124 so as to move to the left the arm 130 with the travel control pistons 49 and 50 as well as the arm 132. The movement of the arm 132 transmits the motion to the link 135 and thence to the reverse gear of the locomotive so as to shift the radius rod, such as, for example, the radius rod 278 shown in Fig. 5, in the usual way in operating the locomotive reverse gear. At the same time that the power pistons 117 and 118 are moved, as above referred to, the shaft 124, by means of the arm 130, will move the travel control pistons 49 and 50 so that the travel of the rod 135 in either direction will be coordinated to the travel of the master pistons 30 and 31 and, therefore, also to the travel of the manual lever 2 in either direction. It will be understood that the movement of the hand lever 2 towards the left, in Fig. 1, will bring about the reverse series of operations of the parts referred to, in order to drive the locomotive rearwardly. In the operation of the said parts the high pressure liquid is provided to supply the ports 84 and 88 in the valve cylinders, by the compressed air which enters the inlet port 143 past the valve 144, 145 and thence to the air motor 138 which drives the pump gear shaft 137 so as to deliver the high pressure liquid through the pipe 85 for supply to the valve inlet ports 84 and 88. This pressure supply is maintained at a given level of pressure by the pressure accumulator 142 in which the piston 162 accumulates the pressure received from the gear pump by the yielding of the coil springs 170 to such a point that when the desired pressure to be maintained is reached the snap action apparatus in the said accumulator causes the interrupted surface or annular flange 185 to suddenly pass by the rollers 183 so that the end of the sleeve 184 contacts with the plug 155 to close the valve 145, 146, and keep the same closed until the release of the pressure on the base of the piston 162 causes the springs 170 to move the interrupted surface or annular ring 185 back below the rollers 183 by a sudden snap action. The snap action produces a positive and quick opening or closing of the valve 145, 146, thus aiding and maintaining at all times the desired pressure in the supply of high pressure liquid.

It will be noted, furthermore, that the chamber 39, in which the pump 136 is located for withdrawal of liquid therefrom, is arranged to receive any leakages or discharge of fluid from the adjacent ends of the cylinders 32, 33, 45, 46, 97, 101, 63 and 64 as well as from the accumulator-snap action device 142 into which the valve stem 147 extends.

In the form of my invention shown in Figs. 5 to 9, and 12 the operation is carried out in a similar way. However, in this instance the master cylinders 216 and 217 are located in the cab of the locomotive so as to avoid any loss or inaccuracy of movement due to lag between the cab and the master cylinder pistons 214, 215. Furthermore, the power unit and control can be mounted irrespective of alignment of shafts with respect to each other. Also, in the cab there is provided an accurate indicating scale 208 which is inclined in a position to provide an effective gradation of readings throughout the forward drive and the rearward drive of the locomotive. With this arrangement of the calibrations on the inclined scale the latter can be more readily seen. Also, in this form of my invention the gear pump 234 is located adjacent to the air motor 239 so as to make the assembly more compact.

The form of my invention as shown in Figs. 10 and 11, operates in a similar manner to the form of my invention shown in Figs. 5 to 9. However, in this instance I have provided means for maintaining the adjusted position of the manual operating lever 199 with the aid of a hydraulic latching or locking device which is comprised of the two latching cylinders 297 and 298, having therein the sleeve plunger 309 carrying the two valves 316 and 317 at the two ends of the said plunger 309 and the two valve operating rods 314 on either side of the manually operable bolt 285. The sleeve plunger 309 moves with the yoke 288 and with the master cylinder plungers 290 and 291 so that the pressure of the liquid exerted on the said master cylinder pistons cannot result, of itself, in displacing the said master cylinder pistons, nor in displacing the adjusted position of the radius rod 278 until the hand lever 199 is moved first manually. Owing to the elongated hole 323 the hand lever 2 first moves one or the other of the valve operating rods 314 to unseat the valve 316, 317 so as to release the liquid past said valve through ports 312 to the casing 201. When the liquid in the other one of the cylinders 297, 298 is being drawn into its particular cylinder, this is accomplished by the entry of the liquid through the particular passageway 300 past the rubber seal 303 and thence into the hydraulic latch chamber. By this means the locomotive reverse gear cannot be accidentally moved out of adjustment by the forces exerted thereon unless the hand lever 199 is moved first to a new position of adjustment.

While I have described my invention above in detail I wish it to be understood that many changes may be made therein without departing from the spirit of the same.

I claim:

1. In combination, a self-contained compact power unit and a hydraulic master cylinder controlling means therefor, said unit comprising a hydraulic power creating device with an inlet, a hydraulic piston motor, comprising cylinders and opposed pistons therein, operated by said hydraulic power and connected to a device to be moved thereby, a modulating valve means, fluid actuated valve operating means connected to the valve means, passage means connecting the valve operating means to the master cylinder controlling means for controlling the application of said hydraulic power to the motor, cylinders connected to said passages and in hydraulic communication with said inlet, at least at times, of said power creating device and opposed pistons therein connected to the said first mentioned pistons to move coordinately to the motor pistons and adapted to coordinate the travel of said controlling means and the device to be moved, and a casing into which all said cylinders open.

2. In combination, a self-contained compact power unit and a master cylinder controlling means therefor, said unit comprising a hydraulic power creating device with an inlet, a hydraulic motor, comprising cylinders and opposed pistons therein, operated by said hydraulic power and connected to a device to be moved thereby in both directions of operation, a valve means, fluid actuated valve operating means connected to the valve means, passage means connecting the valve operating means to the master cylinder controlling means, said valve means comprising a valve device for controlling the movement of the motor in each direction of operation, for controlling the application of said hydraulic power to the motor, cylinders connected to said passages and in hydraulic communication with said inlet, at least at times, of said power creating device and opposed pistons therein connected to the said first mentioned pistons to move coordinately to the motor pistons and adapted to coordinate the travel of said controlling means and the device to be moved in both directions of movement, and a casing into which all said cylinders open.

3. In combination, a self-contained compact power unit and a hydraulic master cylinder controlling means therefor, said unit comprising a hydraulic power creating device with an inlet, a hydraulic piston motor, comprising cylinders and opposed pistons therein, operated by said hydraulic power and connected to a device to be moved thereby in both directions of operation, a modulating valve means, fluid actuated valve operating means connected to the valve means, passage means connecting the valve operating means to the master cylinder controlling means, said valve operating means comprising pistons and cylinders therefor, for controlling the movement of the motor in each direction of operation, for controlling the application of said hydraulic power to the motor, cylinders connected to said passages and in hydraulic communication with said inlet, at least at times, of said power creating device and opposed pistons therein connected to the said first mentioned pistons to move coordinately to the motor pistons and adapted to coordinate the travel of said controlling means and the device to be moved in both directions of movement, and a casing into which all said cylinders open.

4. In combination, a self-contained compact power unit and a master cylinder controlling means therefor, said unit comprising a hydraulic power creating device with an inlet, having a hydraulic piston motor, comprising opposed cylinders and pistons, an accumulator and snap action device in the accumulator for starting and stopping the supply of power to the accumulator, said hydraulic motor being operated by said hydraulic power and connected to a device to be moved thereby in both directions of operation, a valve means, fluid actuated valve operating means connected to the valve means, passage means connecting the valve operating means to the master cylinder controlling means, said valve means comprising a valve device for controlling the movement of the motor in each direction of operation, for controlling the application of said hydraulic power to the motor, cylinders connected to said passages and in hydraulic communication with said inlet, at least at times, of said power creating device and opposed pistons therein connected to the said first mentioned pistons to move coordinately to the motor pistons and adapted to coordinate the travel of said controlling means and the device to be moved in both directions of movement, and a casing into which said cylinders open and in which casing each pair of opposed pistons are connected together, said accumulator having a drain passage leading to said casing.

5. In combination, a self-contained compact power unit and a hydraulic master cylinder controlling means therefor, said unit comprising a hydraulic power creating device with an inlet, having an accumulator and snap action device in the accumulator for starting and stopping the supply of power to the accumulator, a hydraulic piston motor, comprising cylinders and opposed pistons therein, operated by said hydraulic power and connected to a device to be moved thereby in both directions of operation, a modulating valve means, fluid actuated valve operating means connected to the valve means, passage means connecting the valve operating means to the master cylinder controlling means, said valve operating means comprising valve pistons and cylinders therefor, for controlling the movement of the motor in each direction of operation, for controlling the application of said hydraulic power to the motor, cylinders connected to said passages and in hydraulic communication with said inlet, at least at times, of said power creating device and opposed pistons therein connected to the said first mentioned pistons to move coordinately to the motor pistons and adapted to coordinate the travel of said controlling means and the device to be moved in both directions of movement, and a casing into which all said cylinders open and in which casing each pair of opposed pistons are connected together, said accumulator having a drain passage leading to said casing and said valve having a discharge passage to said casing.

6. In combination, a device to be moved, manual means for controlling the position of the same, a master cylinder operated by the manual means, a modulating valve adapted to control the delivery of pressure liquid from the valve, power cylinders and opposed pistons therein operated by said pressure liquid, a casing having a chamber between said power cylinders and on which casing the power cylinders are mounted, said power pistons being connected to said device, and a pump in said chamber having a pressure accumulator connected thereto for supplying said pressure liquid, said master cylinder and modulating valve having fluid connection with said chamber.

7. In combination, a device to be moved, manual means for controlling the position of the same, a master cylinder operated by the manual means, a modulating valve means having opposed cylinders and valve plungers therein adapted to control the delivery of pressure liquid from the valve, power cylinders and opposed pistons therein operated by said pressure liquid, a casing having a chamber between said power cylinders and on which casing the power cylinders are mounted, said power pistons being connected to said device, a pump in said chamber having a pressure accumulator connected thereto for supplying said pressure liquid, and a source of compressed air for operating said pump, said master cylinder, accumulator and modulating valve cylinders having fluid connection with said chamber.

8. In combination, a device to be moved, manual means for controlling the position of the same, a master cylinder operated by the manual means, a modulating valve adapted to control the delivery of pressure liquid from the valve, power cylinders and opposed pistons therein operated by said pressure liquid, a casing having a chamber between said power cylinders, said power pistons being connected to said device, a pump in said chamber having a pressure accumulator connected thereto for supplying said pressure liquid, a source of compressed air for operating said pump, and a valve operated by the accumulator for cutting off the compressed air from the pump, said master cylinder, accumulator and the modulating valve having fluid connection with said chamber.

9. In combination, a device to be moved, a unitary compact power unit comprising manual means for controlling the position of the device, opposed master cylinders, having pistons, operated by the manual means, a modulating valve means having opposed cylinders and valve plungers therein adapted to provide for the controlled delivery of pressure liquid from the valve, power cylinders and opposed pistons therein operated by said pressure liquid, a casing having a chamber between said power cylinders and connected to the valve cylinders and on which casing the power cylinders are mounted, said power pistons being connected to said device, and a pump in said chamber having a pressure accumulator connected thereto for supplying said pressure liquid, said master cylinders, modulating valve cylinders, power cylinders and accumulator being arranged so as to open into said chamber.

10. In combination, a power unit and a master cylinder controlling means therefor, said unit comprising a hydraulic power creating device with an inlet having an intermittently operating pump, a hydraulic motor, having cylinders and pistons, operated by said hydraulic power and connected to a device to be moved thereby, a valve means, fluid actuated valve operating means connected to the valve means, passage means connecting the valve operating means to the master cylinder controlling means for controlling the application of said hydraulic power to the motor, means, comprising cylinders in hydraulic communication with said inlet, at least at times, of said hydraulic power creating device and double opposed pistons connected to said first mentioned pistons and said device to be moved so as to move coordinately to said motor, adapted to coordinate the travel of said controlling means and the device moved by the pressure from said pump, and a casing having a chamber between said cylinders and pistons and on which casing the motor cylinders are mounted, said chamber being connected to the pump, said pump being located in said chamber, said motor having a cylinder communicating with said chamber and said valve means having a fluid connection to said chamber.

11. In combination, a power unit and a master cylinder controlling means therefor, said unit comprising a hydraulic power creating device having an inlet, a hydraulic motor, having oppositely acting pressure-receiving elements, operated by said hydraulic power and connected to a device to be moved thereby, a valve means, having two valves, fluid actuated valve operating means connected to the valve means, passage means connecting the valve operating means to the master cylinder controlling means for controlling the application of said hydraulic power to each of said elements, respectively, of the motor, means, comprising cylinders in hydraulic communication with said hydraulic power creating device and double opposed pistons connected to said elements and connected to said device to be moved so as to move coordinately to said motor, adapted to coordinate the travel of said controlling means and the device to be moved, and a casing, having a chamber between said pistons and on which casing the motor cylinders are mounted, said chamber being connected to said inlet, said hydraulic power creating device being associated with said chamber and said motor having cylinders communicating with said chamber.

12. In combination, a power unit and a master cylinder controlling means therefor, said unit comprising a hydraulic power creating device having an inlet, a hydraulic reciprocating motor, having oppositely acting pressure-receiving elements, operated by said hydraulic power and connected to a device to be moved thereby, a valve means, having two valves, fluid actuated valve operating means connected to the valve means, passage means connecting the valve operating means to the master cylinder controlling means for controlling the application of said hydraulic power to each of said elements, respectively, of the motor, means, comprising cylinders connected to said passages and in hydraulic communication with said hydraulic power creating device and double opposed pistons connected to said elements and connected to said device to be moved so as to move coordinately to said motor, adapted to coordinate the travel of said controlling means and the device to be moved in each of the directions of movement of the hydraulic motor, and a casing having a chamber between said pistons and on which casing the motor cylinders are mounted, said chamber being connected to said inlet, said hydraulic power creating device being associated with said chamber and said pressure-receiving elements being in communication with said chamber.

13. In communication, a power unit and a master cylinder controlling means therefor, said unit comprising a hydraulic power creating device having an inlet, a hydraulic motor, having oppositely acting pressure-receiving elements, operated by said hydraulic power and connected to a device to be moved thereby, a plunger-operated valve means, having two valves having check valved inlets to prevent reversibility, fluid actuated valve operating means connected to the valve means, passage means connecting the valve operating means to the master cylinder controlling means for controlling the application of said hydraulic power to each of said elements, respectively, of the motor, means, comprising cylinders connected to said passages and in hydraulic communication with said hydraulic power creating device and double opposed pistons connected to said elements and connected to said device to be moved so as to move coordinately to said motor, adapted to coordinate the travel of said controlling means and the device to be moved, and a casing having a chamber between said pistons and on which casing the motor cylinders are mounted, said chamber being connected to said inlet, said hydraulic power creating device being associated with said chamber and said pressure-receiving elements being in communication with said chamber.

14. In combination, a power unit and a master cylinder controlling means therefor, said unit comprising a hydraulic power creating device having an inlet, a hydraulic motor, having oppositely acting pressure-receiving elements, operated by said hydraulic power and connected to a device to be moved thereby, a plunger-operated valve means, having, each being individually capable of lapping, two valves, fluid actuated valve operating means connected to the valve means, passage means connecting the valve operating means to the master cylinder controlling means of said elements, respectively, of the motor, means, comprising cylinders in hydraulic communication with said inlet, at least at times, of said power creating device and double opposed pistons connected to said elements and connected to said device to be moved so as to move coordinately to said motor, adapted to coordinate the travel of said controlling means and the device to be moved, and a casing having a chamber between said pistons and on which casing the motor cylinders are mounted, said chamber being connected to said inlet, said hydraulic power creating device being associated with said chamber and said pressure-receiving elements being in communication with said chamber.

15. In combination, a casing, a source of fluid pressure, work performing pistons, a valve mechanism for controlling the supply of fluid pressure thereto, cylinders for said work performing pistons mounted on opposite sides of the casing into which casing the cylinders open, the pistons having a connection through the inside of the casing, master cylinders for operating the valve mechanism, having opposed pistons connected together in said casing into which the master cylinders open, and a pump for producing said pressure, said pump being located in said casing having a pump inlet to draw liquid from within the casing, the casing having exhaust connections leading into the casing from said valve mechanism.

16. In combination, a casing, a source of fluid pressure, work performing pistons, a valve mechanism for controlling the supply of fluid pressure thereto, cylinders for said work performing pistons mounted on the casing into which the cylinders open, the pistons having a connection through the inside of the casing, master cylinders opening into the inside of the casing for operating the valve mechanism, a pump for producing said pressure, said pump being located in the inside of said casing, the casing having exhaust connections leading from said valve mechanism to the inside of the casing, a cover plate for covering the interior of the casing, to which cover plate the pump is connected on the inside of said casing, the pump being located on the inside of the casing, and an air motor and pressure controller for the pump, the air motor being mounted on the outside of the cover plate.

EDWARD A. ROCKWELL.

REFERENCES CITED

The following references are of record in the file of this patent:

UNITED STATES PATENTS

| Number | Name | Date |
|---|---|---|
| 752,491 | Warren | Feb. 16, 1904 |
| 897,907 | Lang | Sept. 8, 1908 |
| 1,147,436 | Ragonnet | July 20, 1915 |
| 1,299,284 | Baader | Apr. 1, 1919 |
| 1,318,732 | De Havilland et al. | Oct. 14, 1919 |
| 1,675,576 | Roberts | July 3, 1928 |
| 1,855,386 | Doolittle | Apr. 26, 1932 |
| 1,960,996 | Guernsey | May 29, 1934 |
| 1,962,857 | Cash | June 12, 1934 |
| 1,976,129 | Johnson | Oct. 9, 1934 |
| 2,136,638 | Rockwell | Nov. 15, 1938 |
| 2,197,772 | Rockwell | Apr. 23, 1940 |
| 2,236,467 | Clench | Mar. 25, 1941 |
| 2,239,566 | Mercier | Apr. 22, 1941 |
| 2,239,893 | Jackman | Apr. 29, 1941 |
| 2,252,660 | Kulikoff | Aug. 12, 1941 |
| 2,261,444 | Neubert | Nov. 4, 1941 |
| 2,264,675 | Nardone | Dec. 2, 1941 |
| 2,276,418 | Rockwell | Mar. 17, 1942 |
| 2,282,652 | Henning | May 12, 1942 |
| 2,349,295 | Napier | May 23, 1944 |

FOREIGN PATENTS

| Number | Country | Date |
|---|---|---|
| 374,583 | Great Britain | June 16, 1932 |